July 22, 1969  C. A. GRAY  3,456,531
DRILLING TOOL

Filed Feb. 13, 1967  2 Sheets-Sheet 1

Inventor:
Charles A. Gray
BY Baldwin Wight Diller & Brown
Attorneys

July 22, 1969     C. A. GRAY     3,456,531
DRILLING TOOL
Filed Feb. 13, 1967     2 Sheets-Sheet 2
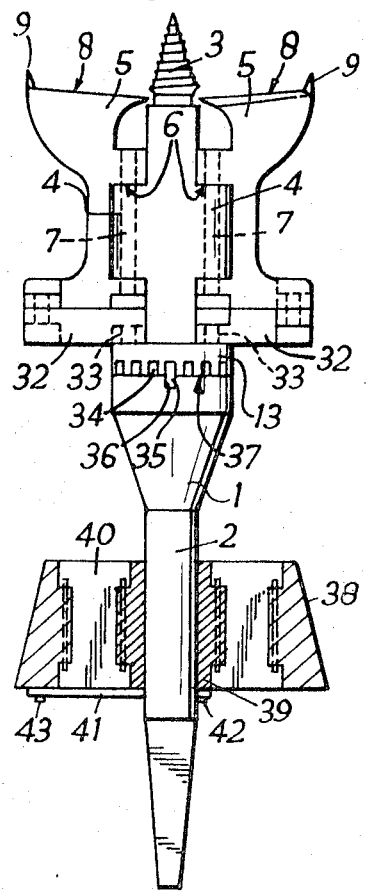
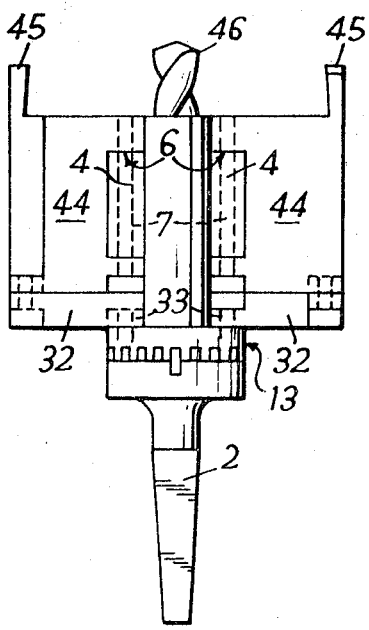
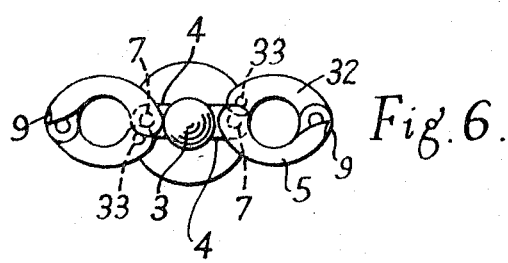

United States Patent Office 3,456,531
Patented July 22, 1969

3,456,531
DRILLING TOOL
Charles A. Gray, 8 Trenethick Close,
Helston, Cornwall, England
Filed Feb. 13, 1967, Ser. No. 615,647
Claims priority, application Great Britain, Feb. 18, 1966, 7,194/66
Int. Cl. B23b 41/00, 51/00
U.S. Cl. 77—67          14 Claims

ABSTRACT OF THE DISCLOSURE

This disclosure relates to a tool for drilling holes of different diameters comprising a main body portion, one end of which carries a pilot, and a cutting arm the inner end of which is pivoted to the main body portion about an axis parallel to but displaced from the axis of rotation of the tool, the outer end of the cutting arm carrying a cutter, and means for rigidly locating the cutting arm in various angular positions about its pivot to vary the circumference described by the cutter when the tool is rotated.

---

According to the present invention a tool for drilling holes of different diameters comprises a main body portion, one end of which carries a pilot screw, drill or guide, and a cutting arm the inner end of which is pivoted to the main body portion about an axis parallel to but displaced from the axis of rotation of the tool, the outer end of the arm carrying a cutter, and means for rigidly locating the cutter arm in various angular positions about its pivot to vary the circumference described by the cutter when the tool is rotated.

The tool may be used on wood, metal, plastics or any other material an appropriate cutter being provided on the cutter arm for the material concerned.

The means for rigidly locating the cutter arm conveniently includes an element connected to the cutter arm which can rotate relatively to the main body about an axis co-axial with the axis of rotation of the tool, and means for locking the rotatable element in various angular positions. Thus, the circumference described by the cutter is controlled by the angular position of the rotatable element.

The locking means may include one or more plungers carried by the main body or the rotatable element or one or more keys which engage slots provided on the rotatable element and the main body.

In any case, the locking means may also include provision for stepless fine adjustment of the cutter arm by providing a screw or other suitable arrangement to any appropriate part of the arm main body or rotatable element.

In a preferred embodiment the rotatable element is connected to the cutter arm by a link, one end of which is pivoted to the arm at a point displaced from the inner end of the arm, and the other end of which is pivoted to the rotatable element, so that when the element is rotated the link transfers the movement to the cutter arm to cause it to move inwardly or outwardly as described.

Alternatively the rotatable element at the inner end of the link is replaced by a sliding connection.

If desired two or more cutter arms may be provided which may be pivoted to the main body in circumferentially spaced relationship. When multiple cutter arms are provided a more balanced tool results for machine use and if used in a hand tool it is easier to ensure that the holes are square to the surface of the material being cut.

Preferably means are also included for indicating the diameter of the circumference described by the cutter or cutters.

In any case the end of the main body portion which is axially displaced from the end which carriers the pilot screw, drill or guide may be provided with a shank which carries a freely rotatable centering device to locate the shank axially within a deep hole.

Figure 1:
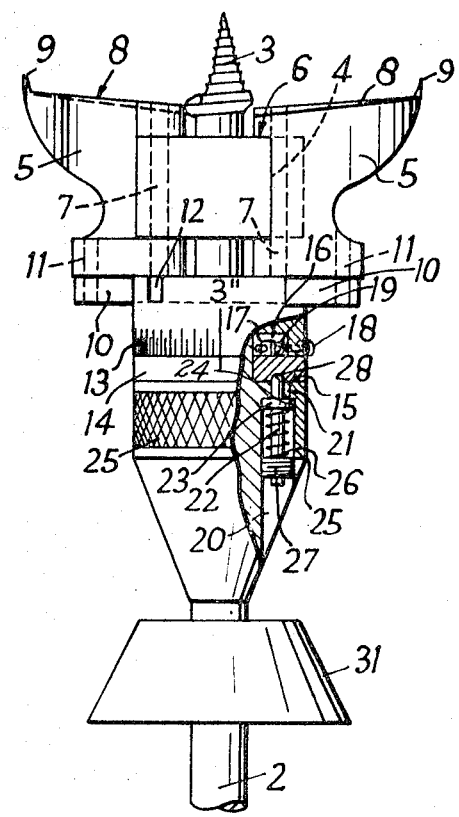
Figure 3:
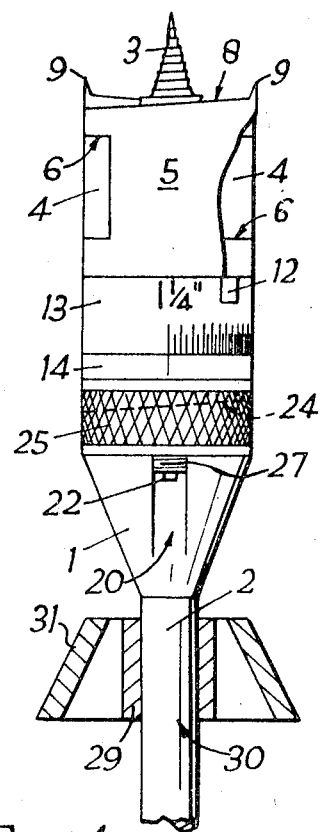
Figure 2:
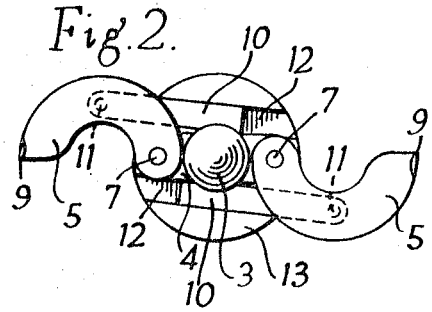
Figure 4:
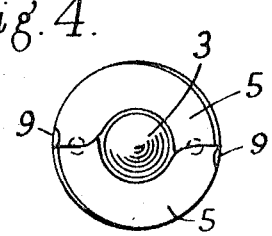

The invention may be performed in various ways but a number of embodiments will now be described by way of example and with reference to the accompanying drawings in which:

FIGURE 1 is a part cross sectional side elevation of a drilling tool according to the invention, set to drill a hole of maximum diameter, FIGURE 2 is an end elevation of the drilling tool shown in FIGURE 1, FIGURE 3 is another side elevation of the drilling tool shown in FIGURE 1 arranged to drill a hole of minimum diameter, FIGURE 4 is another end elevation of the tool as shown in FIGURE 1, FIGURE 5 is a side view of an alternative construction, FIGURE 6 is an end view of the construction shown in FIGURE 5, and FIGURE 7 is a side elevation of another alternative construction.

In the first embodiment to be described and as shown in FIGURES 1–4 the drilling tool is in the form of a bit for use with a drilling machine or hand tool and comprising a main body portion 1 one end of which is formed as a shank 2 for fitting to the machine with which it is to be used. The other end of the main body portion is provided with a helical pilot drill or screw 3 as it is intended that this construction should be used for wood or plastics material. The main body portion extending rearwardly from the helical pilot drill 3 is formed with a pair of lugs 4 to the end of each of which is pivoted an arm 5 the arm being cut away to provide a notch 6 into which a lug 4 can fit and a hinge pin 7 being passed through the lugs 4 and the arm 5 to produce a hinge. The lugs 4 are arranged on diametrically opposed sides of the main body 1 and it will be appreciated that the hinge pins produce a pivoting axis for each of the arms 5 which is parallel to but displaced from the axis of rotation of the tool when in use. Each of the arms 5 extends to a point closely adjacent the rear end of the helical drill 3 and this end of each of the arms is shaped to provide a cutting edge 8, the outer end of which carries the cutter itself, which in this case, is in the form of a protruding sharpened point 9. The arms 5 are curved throughout their length as is shown most clearly in FIGURE 2 so that they can be folded from an outer extended position as shown in FIGURES 1 and 2 to an inner position as shown in FIGURES 3 and 4 in which each arm partially surrounds the main body portion its cutting point 9 lies close to the helical drill 3.

In order to rigidly locate the arms 5 in their desired angular position to produce a given cutting diameter, each arm 5 is provided with a link 10 in the form of a straight bar the outer end of which is pivotally connected by means of a pivot pin 11 to a point on the arm 5 displaced from the main body portion. The other end of the link is housed in a groove 12 in one face of a rotatable element which is in the form of an adjusting ring 13 which is carried on the main body portion 1 and about which it can rotate. Also mounted on the body portion 1 is a fine adjustment ring 14 which has one end face which abuts agianst the adjusting ring 13 and the other end face of which bears against a step 15 provided on the main body portion. The face of the adjusting ring 13 which bears against fine adjustment ring 14 is provided with a small blind bore 16 into which a small lug 17 on the ring 14 can project. The bore 16 is large enough to allow a certain amount of movement of the lug 17 in a circumferential direction and the lug 17 is provided with a screw threaded hole in which a screw 18 which passes through a bore in the wall of the bore 16 is engaged. The screw 18 is retained in the hole in the ring 13 by a suitable locking ring 19 and the arrangement is such that when the screw is rotated relative angular movement is caused to take place between the adjusting ring 13 and the fine adjusting ring 14. A groove 20 is provided behind the step 15 in the main body portion 1 and this finishes short of the step 15 to provide a wall 21 formed with a suitable bore through which a plunger 22 can project. This plunger 22 is provided with a flange 23 which projects radially outwardly beyond the end of the wall 21 where it can be engaged by a projecting face cam 24 formed on the inner circumference of a control ring 25. The plunger 22 is surrounded by a compression spring 26 which is held in place by a screw threaded plug 27 which is screw threaded into the groove 20 which is itself substantially cylindrical. The face of the adjusting ring 14 adjacent to the plunger is provided with a series of depressions 28 into which the plunger can be urged by the spring 26. The diameter of the circumference described by the cutters 9 at the end of each arm 5 can thus be easily adjusted merely by rotating the control ring 25, which is provided with suitable knurling to provide a finger grip. This rotation causes the face cam 24 to move the plunger 22 out of engagement with the fine adjusting ring 14 and the main adjusting ring 13 can then be turned to the appropriate diameter. With the control ring returned to its original position the plunger will engage the appropriate depression in the fine adjusting ring and the links and cutter arms will thus be locked in position. If a finer adjustment is required this can be achieved by rotating the screw 18 as desired.

The adjusting ring 13 carries markings which indicate the overall diameter of the cutters, and these markings may be in the form of two scales one indicating inches and the other being a metric scale.

The shank 2 carries a freely rotatable centering device to locate the shank axially when drilling deep holes. This device is also freely moveable on the shank and comprises a central hub portion 29 provided with a bore 30 to receive the shank 2. An outer rim 31 is displaced from the shank and the outer surface of this is substantially frusto-conical. Thus when drilling this centering device will engage the end of the hole with its frusto-conical surface and thus act to locate the shank and act as a steady bearing.

In FIGURES 5 and 6 an alternative arrangement is shown for positioning the arms 5 and the same reference numerals are used to indicate substantially the same parts. In this arrangement the inner end of each link 32 is pivotally connected by means of a pivot pin 33 to the adjusting ring 13. The links 32 are fastened on one annular face of this ring 13, and the other annular face is provided with slots 34 which can be engaged by a pair of removable keys 35 which can also engage a slot 36 provided in a face 37 at the lower end of the shank against which the slotted face of the ring 13 abuts.

The adjusting ring also carries markings which indicate the overall diameter of the cutters 9 each marking being arranged above an appropriate slot 34 so that when that slot is engaged by the key 35 the diameter of the cutters 9 will be known.

The diameter of the circumference described by the cutters at the end of each arm can thus be easily adjusted merely by removing the keys 35 and turning the adjustment ring 13 to the appropriate slot 34, reinsertion of the keys 35 locking the ring, links 32 and cutter arms 5 in position.

In this arrangement it will be seen that the links by themselves are shaped to fit around the main body portion 1 in order to keep their external dimensions to a minimum when in the retracted position for drilling small diameter holes.

Also shown in FIGURE 5 is a centering device which is of an adjustable diameter. In this arrangement the outer rim 38 is made up of four pieces which are connected to the centre hub 39 by means of pivoted arms 40. A control arm 41 is provided at one end of the device this arm being pivoted at 42 to the hub 39 and having a pin 43 which can be fastened in a series of positions around the rim 38 to cause the device to be expanded and contracted. It will be appreciated that the device can again move axially on the shank 2 and is free to rotate. If desired such an arrangement could be used on the arrangement shown in FIGURES 1–4.

In the embodiment shown in FIGURE 7 the general construction is substantially the same as that set forth in the other constructions but the arms 44 are made in a more robust fashion and the outer ends of the arms carry cutters 45 which are suitable for cutting metals. In this case the helical drill or pilot screw is replaced by a suitable pilot drill 46 which is suitable for use with metal, and the adjustment is similar to that shown in FIGURES 5 and 6. Although it will be appreciated that an adjustment arrangement similar to that shown in FIGURES 1–4 could be used.

Such a hole cutting tool can be provided with a range of adjustment in the proportion of approximately 2.4.1 without any interchangeable loose cutter being necessary and with the double adjustable cutters described a suitably balanced tool for machine use is provided. Moreover, with this arrangement when used in a hand tool, it is easier to ensure that the holes are square to the surface of the material being cut.

Rapid and positive adjustment with positive fine adjustment can be provided and a flat surface to the bottom of a blind bore is possible.

As all the cutting is done by the adjustable cutter, optimum grades of steel or other cutting material or alloy may be used for the main body portion where toughness is necessary and for the adjustable cutter where it is desirable that the cutting edges should be as efficient as possible while having a long life between being sharpened.

It will be appreciated that in all the arrangements described above two cutters arms are used but if desired only one arm need be included or three or four arms could be used if it was necessary for the work concerned. It will also be appreciated that in FIGURES 1–4 only one plunger is shown to locate the fine adjusting ring 14 but again, more than one plunger could be used if it were necessary to provide the necessary robust construction.

What I claim:

1. A tool for drilling holes of different diameters comprising a main body portion, one end of which carries a pilot, a cutting arm the inner end of which is pivoted to the main body portion about an axis parallel to but displaced from the axis of rotation of the tool, an outer end of the cutting arm carrying a cutter, and means for rigidly locating the cutting arm in various angular positions about its pivot to vary the circumference described by the cutter when the tool is rotated.

2. The tool as defined in claim 1 wherein the cutting arm is shaped to allow the cutter to closely approach the axis of rotation of the tool in its innermost angular position.

3. The tool as defined in claim 1 wherein the means for rigidly locating the cutting arm includes an element connected to the cutting arm mounted for relative rotation with respect to the main body about an axis coaxial with the axis of rotation of the tool, and means for locking the rotatable element in various angular positions.

4. The tool as defined in claim 3 wherein the locking means includes at least one plunger carried by the main body on the rotatable element.

5. The tool as defined in claim 3 wherein the locking means includes at least one key which engages a slot provided on the rotatable element and the main body.

6. The tool as defined in claim 3 wherein the locking means includes means for stepless fine adjustment of said cutting arm.

7. The tool as defined in claim 3 wherein the rotatable element is connected to the cutting arm by a link, one end of which is pivoted to the cutting arm at a point displaced from an inner end of the arm, and an opposite end of said link is pivoted to the rotatable element.

8. The tool as defined in claim 3 wherein the rotatable element is connected to the cutting arm by a link, one end of which is pivoted to the cutting arm at a point displaced from the inner end of the arm, and the other end of which is slidably connected to the rotatable element.

9. The tool as defined in claim 8 wherein the inner edge of the link is slidably received in recess means formed in the rotatable element and displaced to one side of the axis of rotation thereof.

10. The tool as defined in claim 3 including an additional cutting arm the inner end of which is pivotally connected to the main body portion about an axis parallel to but displaced from the axis of rotation of the tool and in circumferentially spaced relationship to said first-mentioned cutting arm.

11. The tool as defined in claim 3 including means for indicating the diameter of the circumference described by the cutter.

12. The tool as defined in claim 3 wherein an end of the main body portion which is axially displaced from said pilot is provided with a shank which carries a freely rotatable centering device to locate the shank axially within a deep hole.

13. The tool as defined in claim 12 wherein said centering device is freely movable axially on the shank.

14. The tool as defined in claim 13 wherein the centering device comprises a central hub portion provided with a bore to receive said shank, said centering device further including an outer rim radially displaced from said central hub portion, and an outer surface of said outer rim is of a generally frusto-conical configuration.

References Cited

UNITED STATES PATENTS

| 112,063 | 2/1871 | Mills | 145—127 |
| 737,501 | 8/1903 | Seblom | 145—127 |

FOREIGN PATENTS 228,653    2/1925    Great Britain.

FRANCIS S. HUSAR, Primary Examiner

U.S. Cl. X.R.

77—79; 145—127